United States Patent [19]
White et al.

[11] Patent Number: 5,513,263
[45] Date of Patent: Apr. 30, 1996

[54] METHOD FOR ESTABLISHING CLASSES WITHIN A COMMUNICATION NETWORK

[75] Inventors: Richard E. White, Cary; Mark G. Demange, Schaumburg, both of Ill.

[73] Assignee: Motorola, Inc., Schaumburg, Ill.

[21] Appl. No.: 347,022

[22] Filed: Nov. 30, 1994

[51] Int. Cl.$^6$ ..................................................... H04L 9/00
[52] U.S. Cl. ............................................................ 380/44
[58] Field of Search ........................................ 380/44–50

[56] References Cited

U.S. PATENT DOCUMENTS

5,008,938  4/1991  Freeburg et al. ........................ 380/50
5,199,072  3/1993  White et al. ............................. 380/44

*Primary Examiner*—Salvatore Cangialosi
*Attorney, Agent, or Firm*—Val Jean Hillman

[57] ABSTRACT

User device (12) classes are established in a communications network (100). An access point (10) utilizes a first password to create an encryption key, then generates a plurality of secondary passwords for use by devices (12). User device (12) classes are established by assigning a secondary password to a respective class of users, determining the network access permitted the class, determining the network services provided to the class and finally assigning the secondary password to a device (12') seeking to communicate within the network (100).

9 Claims, 5 Drawing Sheets

| TABLE | |
|---|---|
| IND | REMAINDER |
| 0 | 11 |
| 1 | 01 |
| 2 | 10 |
| 3 | 11 |
| 4 | 00 |
| 5 | 01 |
| 6 | 10 |
| 7 | 00 |
| 8 | |
| 9 | |
| 10 | |

MSB — row 0; LSB — row 7. Table reference 500.

| PASSWORD | KEY | USER CLASS |
|---|---|---|
| abcdef | 11 01 10 11 00 01 10 00 | 1 |
| ABCDEF | 11 01 10 11 00 01 10 00 | 2 |
| MNOPQR | 11 01 10 11 00 01 10 00 | 3 |
| 123456 | 11 01 10 11 00 01 10 00 | 4 |

| INDEX | MOD 4=0 | MOD 4=1 | MOD 4=2 | MOD 4=3 |
|---|---|---|---|---|
| 0 | X | y | z | w |
| 1 | T | 1 | 2 | 3 |
| 2 | 4 | U | v | s |
| 3 | H | 9 | 6 | 7 |
| 4 | P | q | r | o |
| 5 | D | A | B | C |
| 6 | L | m | n | K |
| 7 | L | e | F | G |
| 8 | X | i | i | g |
| 9 | 8 | I | J | k |
| 10 | P | e | f | c |
| 11 | d | M | N | W |
| 12 | h | a | b | O |
| 13 | 0 | Q | R | S |
| 14 | t | U | Z | |
| 15 | | Y | V | |
| 16 | | 5 | | |

METHOD FOR ESTABLISHING CLASSES WITHIN A COMMUNICATION NETWORK

FIELD OF THE INVENTION

This invention relates generally to communication networks and particularly to a method for establishing classes within such a network.

BACKGROUND OF THE INVENTION

Businesses which utilize communication networks may transmit data using both wire line and wireless technologies such as radio frequency (RF) or infrared (IR) communications. Since the data may be of a proprietary nature, it is often desirable to keep it secret (i.e., free from unauthorized detection). One solution is to restrict access within the network of concern.

Figure 1:
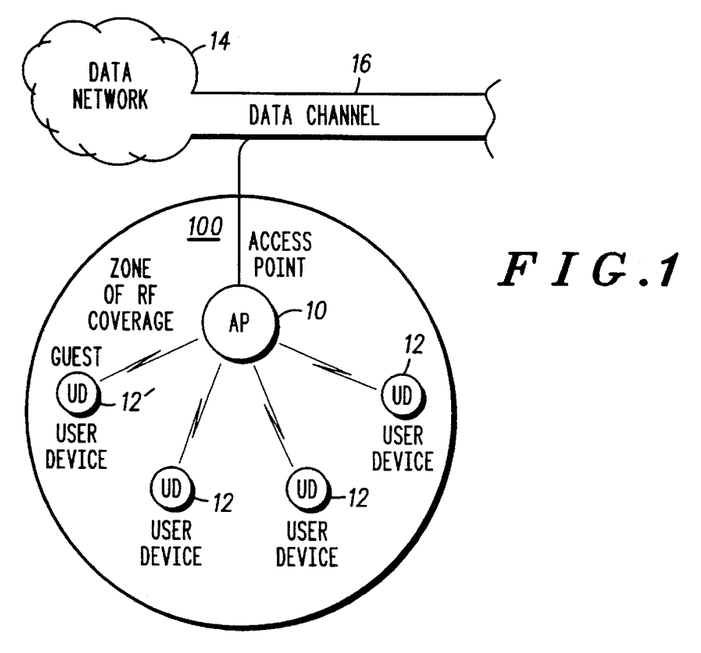
FIG. 1 illustrates a wireless Local Area Network (LAN) suited for incorporating the present invention.

FIG. 1 illustrates a communications network comprising wireless LAN 100 having a central controller or access point (AP) 10 that utilizes RF communications to communicate with a number of user devices (UDs) 12, such as portable computers, lap-top computers, personal digital assistants (PDAs) and the like. In the illustrative network, AP 10 is also connected to data network 14 by data channel 16 which may include, but is not limited to wires or optical links.

AP 10 controls communication within the illustrated network and passes information between data network 14 and the plurality of devices 12 within its zone of RF coverage. The information is conveyed in the form of packets. Data network 14 may consist of an Ethernet network, a Token Ring network or any other of the well known voice and/or data networks.

Access to the wireless LAN 100 is typically controlled by AP 10, in response to UD 12 requests. During operation, a password is entered into a UD seeking access within LAN 100. In response to the password, the UD will select a key and a polynomial. Thereafter, packets received by and transmitted from that UD are encrypted via the selected key and polynomial. Communications is permitted if the UD selected key and polynomial is identical to the key and polynomial used by the servicing AP 10. For additional information on a method for selecting key and polynomial values for use during encryption, the interested reader is directed to U.S. Pat. No. 5,199,072, filed Feb. 3, 1992 and assigned to the assignee of the present invention.

Under this scenario, only authorized UDs (i.e., those utilizing the proper key and polynomial) will be able to communicate within LAN 100. Once an authorized UD gains access to LAN 100, it has unlimited access to the entire network connected to AP 10. In many instances, however, it will be desirable to limit the type of access and services offered particular UDs. This is especially true when LAN 100 is deployed in an office environment.

In an office, some employees seeking to access LAN 100 will require full and complete access to network information, capabilities and services. Others will not. Likewise, when a UD 10 is being operated in the office by a non-employee or guest, it is typically undesirable to provide such individuals with full and complete access to ones internal communications network.

It would be extremely advantageous therefore to provide an access methodology supporting the establishment of multiple classes of users (i.e., UDs 10). Some user classes will have unlimited access to the network, others will not. In addition to different access capabilities, the level of service offered to users within the various classes may also differ.

DETAILED DESCRIPTION OF THE PREFERRED EMBODIMENT

Figures 2, 5, 10:
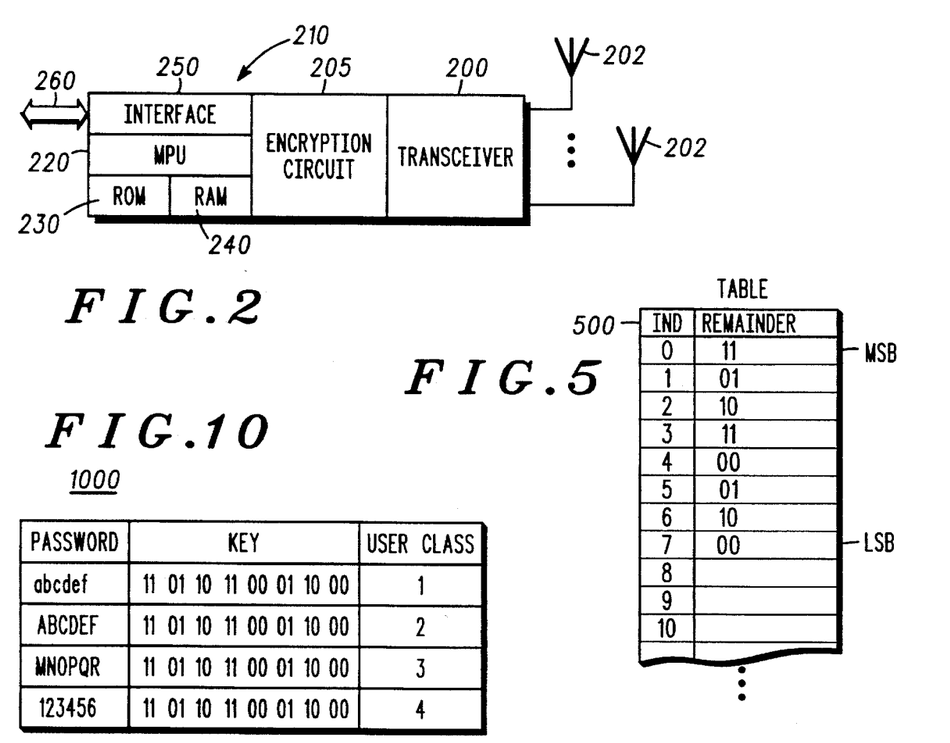
FIG. 2 illustrates a block diagram of a structure common to both the access point and a user device of FIG. 1.
FIG. 5 depicts a table structure for use by AP 10 during key generation.
FIG. 10 depicts a possible look-up table structure for use by the AP 10 during the registration of a guest UD.

With reference to FIG. 2, a block diagram of a structure common to both access point 10 and a user device 12 is shown. A wireless transceiver 200 utilizes digital data to modulate a carrier signal to transmit desired data and its receiver converts received signals into corresponding digital data as is known in the art. Transceiver 200 employs one or more antennas designated 202 for communicating with other devices in LAN 100; namely UDs 12 and AP 10.

In accordance with the present invention, transceiver 200 is an RF transceiver. It will be appreciated by those skilled in the art, however, that transceiver 200 may comprise other known wireless technologies such as, but not limited to infrared (IR) communications.

A communications controller 210 includes a microprocessor 220, with associated read only memory 230, random access memory 240 and an interface 250. Microprocessor 220 operates under the control of an operating system contained in read only memory 230 and utilizes random access memory 240 to control inbound and outbound data traffic carried by path 260 and transceiver 200. Interface 250 may consist of line drivers, input/output buffers and registers as is conventional in microprocessor systems. The path 260 corresponds to data channel 16 of FIG. 1 when the structure is an embodiment of AP 10 and may correspond to a connection to an external terminal device (not shown) when the structure is an embodiment of UD 12.

The device of FIG. 2 also comprises an encryption circuit 205 connected between transceiver 200 and controller 210. Encryption circuit 205 encrypts packets of information prior to transmission by transceiver 200 and decrypts packets of information received by transceiver 200, prior to delivery to controller 210.

Figure 3:
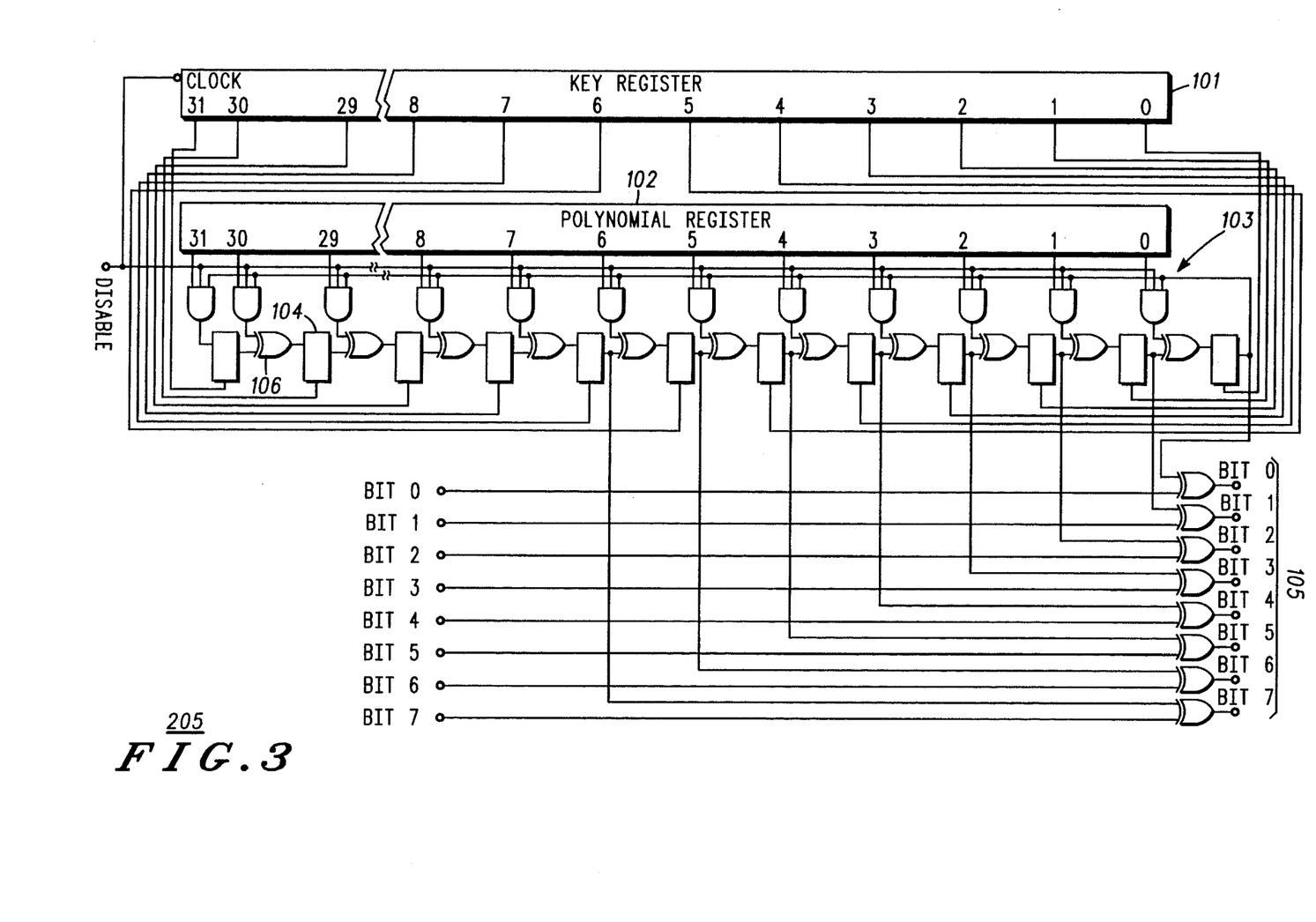
FIG. 3 is a detailed circuit diagram of the encryption circuit of FIG. 2.

FIG. 3 is a detailed circuit diagram of the encryption circuit 205 of FIG. 2 For a detailed operational description, the interested reader may refer to U.S. Pat. No. 5,008,938, filed Mar. 9, 1990 and assigned to the assignee of the present invention. Of note, the encryption circuit 205 of FIG. 3, as described in U.S. Pat. No. 5,008,938 utilizes programmable (i.e., changeable) polynomial values in order to constantly change the encryption algorithm. In accordance with the preferred embodiment of the present invention, however, the polynomial used during encryption is a fixed value. As will be appreciated by those skilled in the art, encryption circuit 205 can be either programmed or wired such that the polynomial used during encryption is a fixed value. Of additional note, while the circuit disclosed in FIG. 3 depicts a 32 bit encryption circuit, it will be appreciated by those skilled in the art that any length encryption circuit may be implemented in accordance herewith. In the preferred embodiment, the circuit of FIG. 3 is 16 bits in length.

Figure 4:
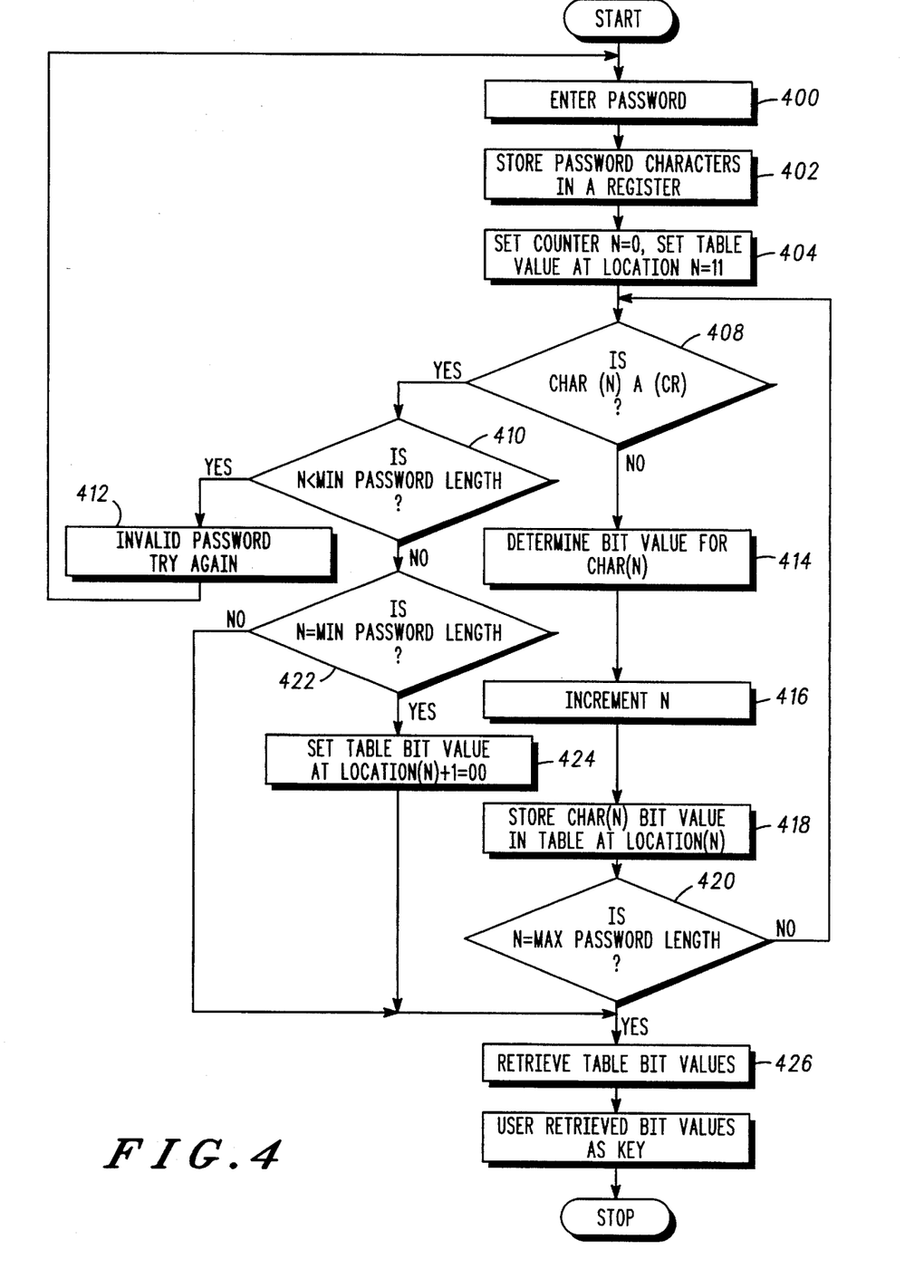
FIG. 4 is a flow chart diagram of the steps performed by AP 10 of FIG. 1 during key generation in accordance with the present invention.

Referring to FIG. 4, a flow chart diagram of the steps performed by AP 10 of FIG. 1 during key generation is depicted. Starting at block 400 a password is entered into AP 10 at block 402 via an external terminal and serial data port (not shown in FIGS. 1 and 2). Each password is a character string, such as, for example, an ASCII (American Standard Code for Information Interchange) character string having a length defined as N. For the purpose of delimitation, N has a maximum and a minimum value.

While the preferred embodiment suggests the password is an ASCII character string, it will be appreciated that such password may also comprise any of the other well known character types which are capable of binary representation.

From block 402, flow proceeds to block 404 where the password characters are stored in a serial interface register like those known in the art. At block 406 an N counter and Table 500 of FIG. 5 are initialized. This corresponds to setting the counter to zero and setting the most significant bits of Table 500 to a non-zero value. In accordance with the preferred embodiment the most significant bits of Table 500 are set to 11.

Proceeding to block 408, a check is made to determine whether the password character corresponding to count N is a carriage return (<CR>). If so, flow proceeds to block 410 where a check is performed to determine whether the password character count is less than the minimum ("MIN") password character length. If so, flow branches to block 412, where an indication of an invalid password is given and permission to try again is granted. In accordance, flow will branch back to block 402.

In accordance with the preferred embodiment, the minimum ("MIN") password character length is 6 characters. Of course this is an optional value that may be changed depending upon a particular application.

Assuming the password character corresponding to count N at block 408 is not a carriage return, flow proceeds to block 414 where a bit value for the password character corresponding to count N is determined. The present invention employs Modular-4 addition in order to determine the password character bit value at block 414. It will nonetheless be appreciated by those skilled in the art, after familiarity with the following discussion, that virtually any logic function could be employed in block 414 to make such a determination. By way of example, block 414 may comprise an arithmetic expression such as, but not limited to modular addition, an algebraic expression or a qualifying function such as, but not limited Boolean and/or fuzzy logic. These are but a few of the immediately available alternatives that will be considered by those skilled in the art.

From block 414, flow proceeds to block 416 where the counter N is incremented. Next, at block 418, the bit value representation determined at block 414 is stored to Table 500 at location N. At block 420 a check is performed to determine whether the maximum ("MAX") password length has been exceeded. If not, flow branches back to block 408 where a next password character is evaluated.

In accordance with the preferred embodiment, the maximum ("MAX") password character length is 12 characters. Of course this too, like the minimum ("MIN") password character length is an optional value that can be changed without departing from the spirit of the present invention.

Assuming at block 410 it is determined that the MIN password character length has been exceeded, flow proceeds to block 422 where a check is performed to determine whether the count N is equal to the MIN password character length when a carriage return is identified at block 408. If so flow proceeds to block 424 where the Table 500 entry corresponding to N+1 is set to 00. This corresponds to the least significant bits (LSB) of the key being set to 00.

From blocks 420, 422 or 424, flow proceeds to block 426 and 428 where the Table 500 contents are used as the encryption key.

By way of example and not by way of limitation, assume the primary password entered at AP 10 is 123456. The first password character is therefore "1". As is known, the ASCII equivalent code for 1 is 049. The Modular 4 remainder of 049 is 1, having a binary representation of 01. After the initialization of Table 500 at block 406, 11 is stored in the first Table location. At step 418 in accordance with the present example 01 is stored in the second Table 500 location.

The second password character in the example is "2". As is known, the ASCII equivalent code for 2 is 050. The Modular-4 remainder of 050 is 2, having a binary representation of 10. In accordance, at step 418 the value 10 is stored in the third location in Table 500.

The third password character in the example is "3". As is known, the ASCII equivalent code for 3 is 051. The Modular-4 remainder of 051 is 3, having a binary representation of 11. In accordance, at step 418 the value 11 is stored in the fourth location in Table 500.

The fourth password character in the example is "4". As is known, the ASCII equivalent code for 4 is 052. The Modular-4 remainder of 052 is 0, having a binary representation of 00. In accordance, at step 418 the value 00 is stored in the fifth location in Table 500.

The fifth password character in the example is "5". As is known, the ASCII equivalent code for 4 is 053. The Modular-4 remainder of 053 is 1, having a binary representation of 01. In accordance, at step 418 the value 01 is stored in the sixth location in Table 500.

Finally, The sixth password character in the example is "6". As is known, the ASCII equivalent code for 6 is 054. The Modular-4 remainder of 054 is 2, having a binary representation of 10. In accordance, at step 418 the value 10 is stored in the seventh location in Table 500.

It will be assumed that the last password character is followed by a carriage return <CR>, thus at step 408, the yes branch is taken to block 410. Since N at block 410 is not less than the MIN password character length, flow proceeds to block 422. Since N is 6, the minimum password character length, flow proceeds to block 424 where the value 00 is stored in the eighth location in Table 500. Had the password been seven characters long, block 424 would be bypassed and the seventh characters content as determined at block 418 would be stored in Table 500 at the eighth entry location.

As will be appreciated from the present example, the first seven characters of the password are used to generate the key. Of note, this implementation, like the MAX and MIN character string length is an optional value that may be changed without departing from the spirit of the present invention.

At blocks 426 and 428, the table 500 content as is shown in FIG. 5 are retrieved and used as the key. In accordance with the preferred embodiment, the key comprises the first 16 bits of Table 500. Notwithstanding, it will be appreciated by those skilled in the art that a key of differing size can be utilized. In addition to binary expressions, the key may also be expressed in octal, decimal, hexadecimal or other base system expressions.

In accordance with the present example, the 16 bit key generated by the present invention and in accordance with the password 123456 is '1101101100011000'. In accordance, all data received and transmitted by transceiver 200 of AP 10 of LAN 100 will be encrypted with this key. In order for various classes of users to be established in accordance with the present invention, AP 10 must generate alternate passwords, which when entered into the key generation method of FIG. 4, will generate the identical key of the present example. Having generated these alternative passwords, AP 10 can then define, for each such password, a user class. By definition a user class comprises a level of network access and a level of network services.

By way of example and with reference to FIG. 1, let's assume user devices 12 are operated by office employees. These individuals need full and complete access to the network (e.g., wireless and wire line) and the full complement of service capabilities to perform their functions. By entering password '123456' into their respective devices, they will gain access to AP 10 as described herein above. If AP 10 recognizes this password as corresponding to a user class having full and complete network functionality, it will permit these devices access to both the wireless and the wire line communication systems. In addition, devices operating with password '123456' may receive higher communications priority, enhanced security, interference-free channels or any number of service related enhancements.

At the same time, within LAN 100 there is a guest user 12'. Let's assume this individual is a non-employee visitor within the office seeking to access LAN 100 in order to conference with certain office employees. Let's assume this guest is given password 'abcdef'. Let's further assume password 'abcdef' will permit device 12' to access AP 10. If AP 10 recognizes password 'abcdef' as corresponding to a user class having limited network access, AP 10 may permit device 12' access to the wireless communication systems while denying device 12' access to the wire line system. In addition, to network access, the use of password 'abcdef' will inform AP 10 of the level of network service to be offered to devices in that class; such services including, but not limited to communications priority, level of security and channel quality.

In order to establish the hierarchical user classes envisioned by the present invention, it is necessary that there be available for use a secondary password for each offered class. For example, if there are six classes of user service offered within LAN 100 of FIG. 1, then there must be six secondary passwords known to AP 10 and available for use by devices operating within the six classes.

Figure 6:
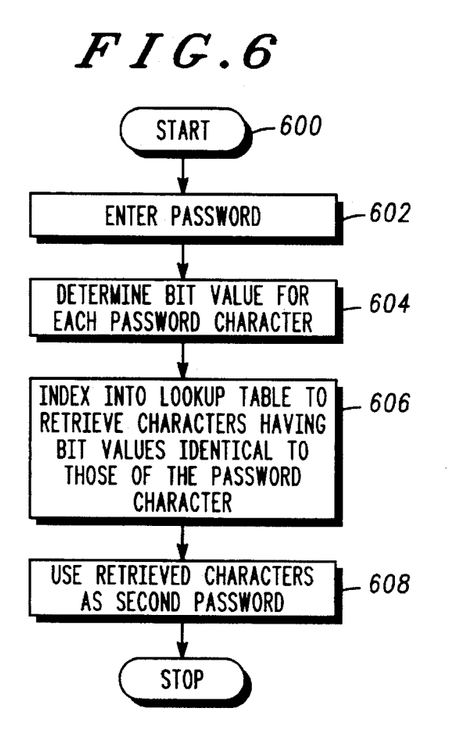
FIG. 6 is another flow chart diagram of steps performed by AP 10 in order to generate a secondary password.

FIG. 6 is a flow chart diagram of steps performed by the processor 220 of AP 10 under the direction and control of program interactions stored in ROM 230 and assisted by tables stored in RAM 240 in order to generate a secondary password. Commencing at block 600 flow proceeds to block 602 where a system password is entered. As previously mentioned this password is typically an ASCII character string of 6 to 12 characters selected from the group consisting of, but not limited to: numerals 0–9; letters a–z and A–Z; and key board characters ~ ! @ # $ % ^ & * ( ) _ + ! { } : " < > ? / . , ' ; [] = and –.

From block 602, flow proceeds to block 604 where a bit value for each of the password character is determined. In accordance with the preferred embodiment, a modular arithmetic function is employed at step 604; in particular, modular-4 addition. Notwithstanding, it will be appreciated by those skilled in the art that other arithmetic, algebraic or logic functions might be substituted for the modular addition performed at step 604.

Figure 8:
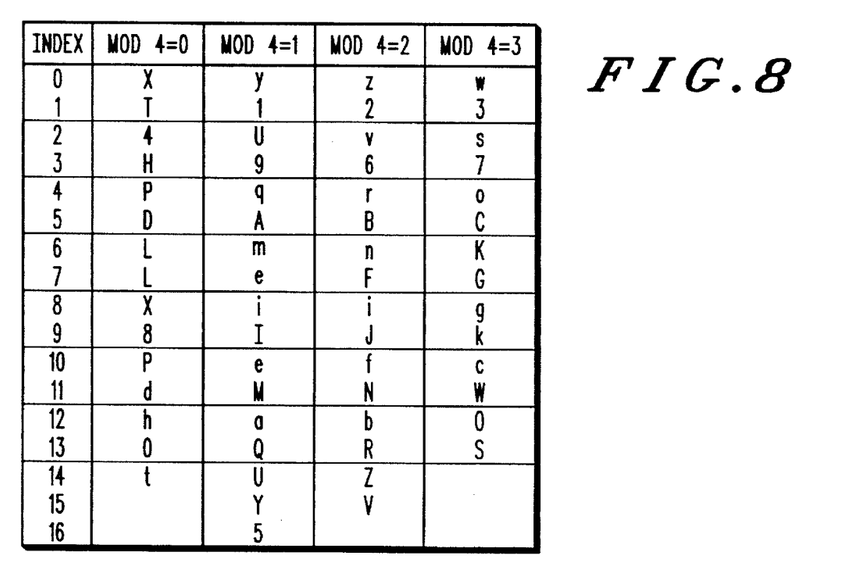
FIG. 8 depicts a look-up table structure for use by AP 10 during secondary password generation.

From block 604 flow proceeds to block 606 where the processor 220 of FIG. 2 indexes into RAM 240 lookup Table 800 of FIG. 8 to retrieve characters having identical bit values as the bit values exhibited by the password characters.

With reference to FIG. 8 and Table 800, it will be appreciated by those skilled in the art that the password character bit value representations appearing in Table 800 are arranged in accordance with their respective bit values. In accordance, Table 800 of FIG. 8 is arranged such that column 1 comprises the available password characters whose Modular-4 remainder is always 0. Column 2 comprises the available password characters whose Modular-4 remainder is always 1. Column 3 comprises the available password characters whose Modular-4 remainder is always 2. While Column 4 comprises the available password characters whose Modular-4 remainder is always 3.

Regardless of the arithmetic, algebraic or logic function employed at block 604 to qualify the password characters, lookup table 800 will utilize a similar arrangement or grouping as depicted in FIG. 8. For convenience and by way of example, not by way of limitation, the set of valid secondary password characters has been restricted to those depicted in FIG. 8.

Referring back to FIG. 6, assuming, from a previous example, the password entered at block 602 is '123456', the modular-4 remainder for each password character is: 1,2,3, 0,1,2. By indexing into lookup table 800 of FIG. 8 and retrieving a character string that exhibits identical modular-4 remainders (i.e., 1,2,3,0,1,2), yields a secondary password which when entered into the key generation methodology of FIG. 4, will generate a key identical to the key generated by that methodology when operated upon password '123456'. By way of example, 'abcdef' is a secondary password of '123456'.

As previously mentioned, and in accordance with the present embodiment, each valid password may comprise a maximum of 12 characters. Rather than determining the modular remainder for all 12 characters, it may be desirable to determine a set of most significant password characters, determining the modular remainder for the most significant password characters and index into the lookup table to retrieve characters having modular remainders identical to the modular remainders exhibited by the most significant password characters.

With reference to block 606, it will be appreciated by those skilled in the art that the step of indexing my employ random indexing or deterministic indexing into lookup table 800 to retrieve characters from the respective columns, different from the original password characters, but nevertheless having modular remainders identical to the modular remainders exhibited by the original password characters. Deterministic, indexing anticipates a systematic, periodic or repeatable method for indexing into a row of the appropriate column of Table 800. Random indexing anticipates a method for indexing into a row of the appropriate column of Table 800 lacking a definite plan or pattern.

An example of a deterministic approach to indexing comprises the use of a linear feedback shift register (LFSR) to generate a pseudo random (PN) signal that determines the row of the appropriate column that is indexed. As is known in the art a PN signal is a binary signal, which appears to be random. In reality a PN signal is not random at all; it is a periodic signal whose periodicity is dependent upon the number of stages within the LFSR, the feedback taps, and the LFSR;s initial conditions. It will be appreciated by those skilled in the art that many other deterministic approaches to indexing may be substituted for the example mentioned herein without departing from the spirit of the present invention.

An example of a random approach to indexing comprises adding the ASCII equivalent code values for the password characters in question, identifying the Table 800 column that must be indexed into, determining the number of characters in that column of the Table and performing that modular addition upon the ASCII equivalent code value in order to derive an index value. For example, lets assume the system password is 'Fast24' and we desire to find a Table 800 character to be used in place of the first password character F. In accordance with the random selection method set out above, first, the ASCII equivalent value for the password character string 'Fast24' is determined. It is 500. The modular-4 remainder for the character "F" is 2. To find a suitable substitute, indexing into column 3 of Table 800 is required. There are 16 characters represented in column 3 of Table 800, therefore Modular-16 addition is performed upon the value 500 with a remainder value of 4. 4 is therefore used as an index into column 3. The first character in the secondary password in accordance with this method of indexing is "r".

Continuing, the ASCII equivalent code addition for the password character string commencing with "a" is 430. The modular-4 remainder for the character "a" is 1. To find a suitable substitute, indexing into column 2 of Table 800 is required. There are 17 characters represented in column 2 of Table 800, therefore Modular-17 addition is performed upon the value 430 with a remainder of 5. 5 is used to index into column 1. The second character in the secondary password is therefore "A".

Continuing to follow this approach will render the secondary password 'rAWxn1'. Other secondary passwords can be made available by either using different indexing methods or by using the same indexing method after having rearranged the order of the characters that appear in the columns of Table 800 FIG. 8.

Figure 7:
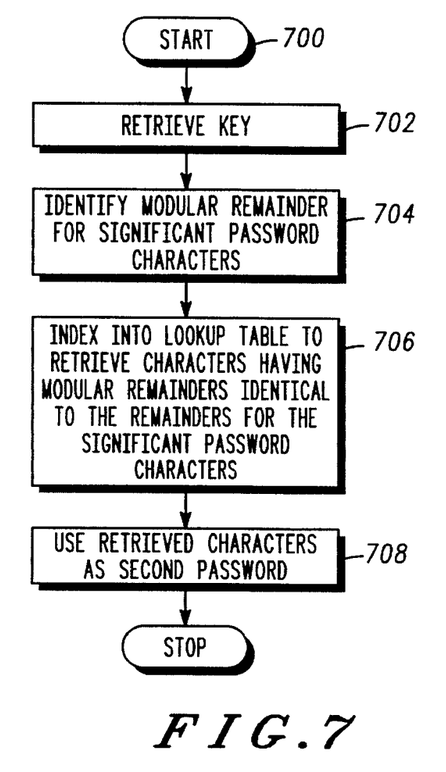
FIG. 7 is yet another flow chart diagram of steps performed by AP 10 in order to generate a secondary password.

FIG. 7 is flow chart diagram of a set of alternative steps performed by AP 10 in order to generate a secondary password. Commencing at block 700, flow proceeds to block 702 where the key is retrieved from Table 500. At block 704 the modular remainder for the most significant password characters is identified from the key. At block 706, the lookup table 800 is indexed to retrieve characters having modular remainders, identical to the modular remainders exhibited by the most significant password characters. Thereafter, at block 708, the retrieved characters are used as a secondary password.

Figure 9:
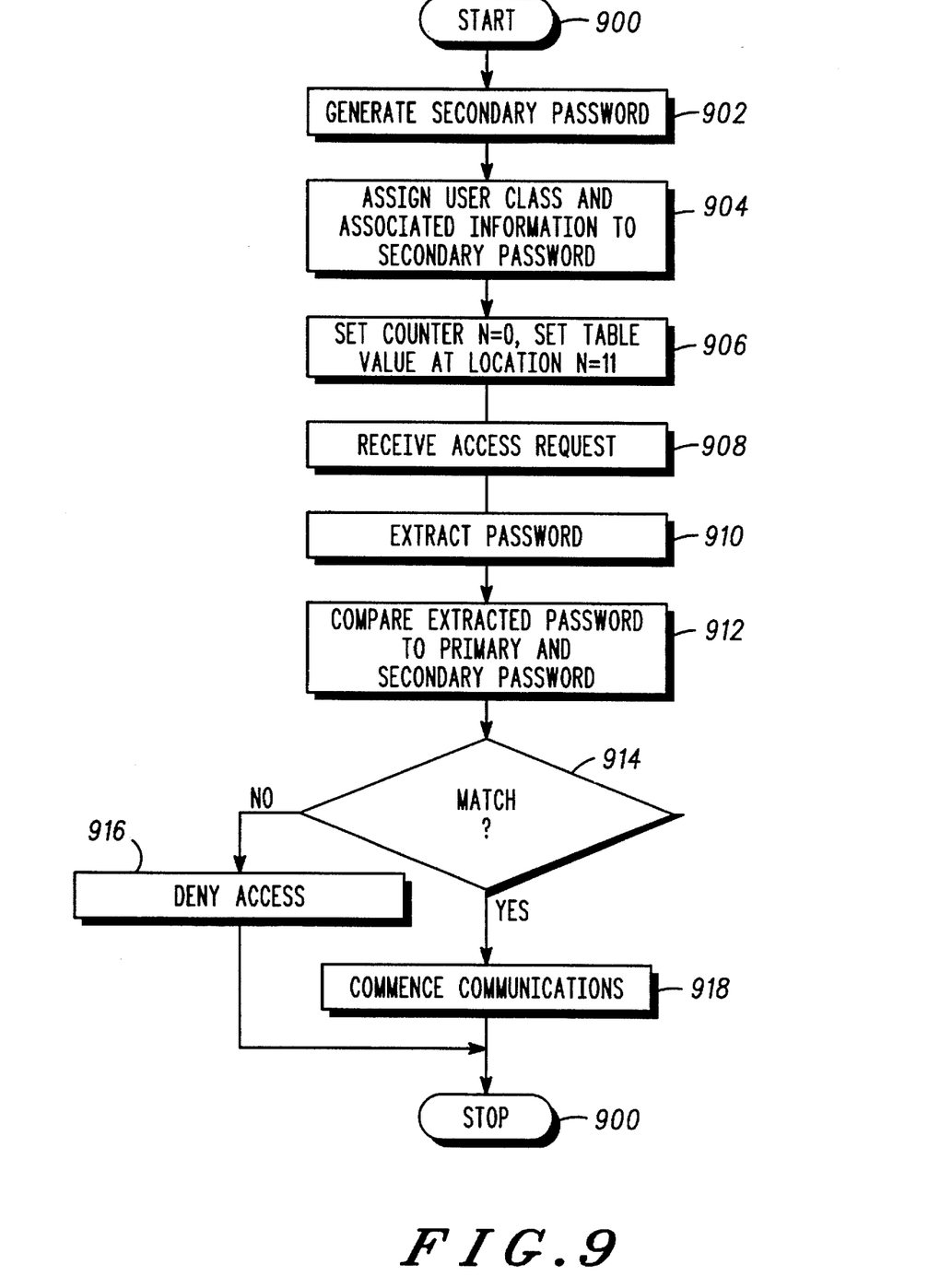
FIG. 9 is a flow chart diagram of the steps performed by AP 10 during guest UD registration in accordance with the present invention.

FIG. 9 is a flow chart diagram of the steps performed by AP 10 during guest UD 12' registration in accordance with the present invention. Commencing at start block 900, flow proceeds to block 902, where AP 10 generates a number of secondary passwords in accordance with the teaching of either FIGS. 6 or 7 herein above. As will be appreciated, said secondary passwords are each different from one another and the original or system password used to generate the key (i.e., they comprise different character strings). Not withstanding these differences, the secondary passwords, when used to generate a key, in accordance with the methodology set forth in association with FIG. 4 above, will nevertheless reproduce the identical encryption key as did the original password.

From block 902, flow proceeds to block 904 where AP 10 assigns to each secondary password a user class and associated user class information. Such information operates to define the network access and the network services offered to class members. Network access information determines whether class members receive limited or unlimited network access. Network service information determines the quality of service offered class members. Such services typically include, but are not limited to message security and priority levels as well as channel quality levels.

From block 904, flow proceeds to block 906 where AP 10 stores each secondary password and its associated user class information in memory table 1000 of FIG. 10.

The UD 12' operator typically receives the secondary password from a network administrator. The password is entered into device 12' as a part of the start-up and/or registration operation. During device registration, UD 12' will communicate an access request massage to AP 10 requesting communication services. A part of each access request comprises password information.

Continuing, when the UD 12' generated access request is received by AP 10 at block 908, flow proceeds to block 910 where the password is extracted therefrom and compared against the content of password table 1000 of FIG. 10 at block 912. As will be appreciated, Table 1000 contains the primary system password '123456' as well as all associated secondary passwords.

Assuming a match is found at block 914, AP 10 will permit UD 12' to communicate within network 100 of FIG. 1 in accordance with those limitations as set forth by the user class profile (i.e., the level of network access and the level of network services) established in association with that password. If no match is found, access is denied at block 916.

In order to provide AP 10 with power surge protection, the primary and secondary passwords in addition to the key and all user class information may be stored in the non-volatile memory of RAM 240 of FIG. 2, thereby permitting system power down without the loss of current key and password values.

We claim:

1. In a communication network having an central controller, said controller having a key generator that utilizes a first password comprising characters to generate an encryption key, a method for establishing hierarchical user classes within said network, said method comprising the steps of:

generating a number of secondary passwords that when entered into the key generator, will generate the encryption key, said secondary passwords having different characters than the first password;

assigning to each secondary password a user class and associated information;

storing each secondary password and associated user class information in central controller memory; and assigning at least one secondary password to at least one remote device seeking to communicate with said central controller.

2. The method of claim 1 further comprising the steps of:

determining a level of network access for a respective class; and determining a level of network service provided a respective class.

3. The method of claim 2 wherein the step of determining a level of network access further comprises the steps of:

determining whether the class receives limited network access; and determining whether the class receives unlimited network access.

4. The method of claim 2 wherein the step of determining a level of network service further comprises at least one of the steps of:

establishing a priority level for the class;

establishing a security level for the class; and establishing channel quality levels for the class.

5. The method of claim 1 wherein the step of generating secondary passwords further comprises the steps of:

determining a modular remainder for each first password character; and indexing into a lookup table to retrieve characters having modular remainders identical to the modular remainders exhibited by the first password characters.

6. The method of claim 1 wherein the step of generating secondary passwords further comprises the steps of:

selecting the first password from a first set of password characters;

determining a second set of password characters;

providing a bit value to each password character, at least some of the password characters of the first set having identical bit value representations as some of the password characters of the second set;

determining the bit value representations for each character of the first password; and selecting characters from the second set of password characters having bit value representations identical to the bit value representations exhibited by the characters of the first password.

7. The method of claim 1 wherein the step of generating secondary passwords further comprises the steps of:

retrieving the key by entering the first password into the key generator;

identifying, from the key, a modular remainder for each first password character; and indexing into a lookup table to retrieve characters having modular remainders, said modular remainders being identical to the modular remainders exhibited by the first password characters.

8. The method of claim 1 further comprising the steps of:

the at least one remote device communicating the secondary password to the communications controller;

the communications controller:

identifying a user class based upon the secondary password; and providing the at least one remote device the level of network access and the level of network service associated with the identified class.

9. The method of claim 1 further comprising the step of:

generating a number of secondary passwords that when entered into the key generator, will generate the encryption key, said secondary passwords having characters different from the characters of the first password, said secondary passwords further having characters different from one another.

* * * * *